United States Patent [19]

Maltby

[11] 4,165,035

[45] Aug. 21, 1979

[54] THERMALLY ACTUATED VALVE FOR PLURAL FLUID SOURCES

[75] Inventor: Edgar W. Maltby, Elgin, Ill.

[73] Assignee: Eaton Corporation, Cleveland, Ohio

[21] Appl. No.: 839,723

[22] Filed: Oct. 5, 1977

[51] Int. Cl.² .......................................... G05D 23/12
[52] U.S. Cl. ..................................... 236/86; 236/100; 137/625.26
[58] Field of Search .......... 236/99 K, 100, 86, 101 A; 123/117 A; 137/625.26, 625.27, 625.49, 625.5

[56] References Cited

U.S. PATENT DOCUMENTS

| 3,738,571 | 6/1973 | Elmer | 236/100 |
|---|---|---|---|
| 3,884,266 | 5/1975 | Kondo | 137/625.27 |
| 4,000,849 | 1/1977 | Wagner et al. | 236/100 |
| 4,026,325 | 5/1977 | Loveless | 137/625.26 |
| 4,026,434 | 5/1977 | Doherty, Jr. | 123/117 A X |
| 4,036,433 | 7/1977 | Wagner et al. | 236/86 X |

*Primary Examiner*—William F. O'Dea
*Assistant Examiner*—William E. Tapolcai, Jr.
*Attorney, Agent, or Firm*—R. J. McCloskey; R. A. Johnston; E. C. Crist

[57] ABSTRACT

The invention relates to a four-port thermally responsive valve for valving two normally closed fluid ports and one pair of normally open fluid ports in response to predetermined temperatures. A single valve member is movably contained within a housing passageway and spring biased in a first position so that a sealing surface at each end of the valve member is respectively engageable with and spaced from corresponding seating surfaces in the passageway for achieving initially open or closed valved conditions between the individual ports in each pair. A centrally located seal ring mounted in the housing passageway and surrounding the valve member isolates one pair of fluid ports from a second pair of fluid ports when the valve member is moved to a second position thereby permitting three valving functions to be attained with one device. When predetermined temperatures are encountered, a thermally responsive actuator connected to the valve member by a rod overcomes the biasing force generated by the spring and moves the valve member to the second position, valving substantially simultaneously each pair of fluid ports.

13 Claims, 3 Drawing Figures

U.S. Patent  Aug. 21, 1979  4,165,035
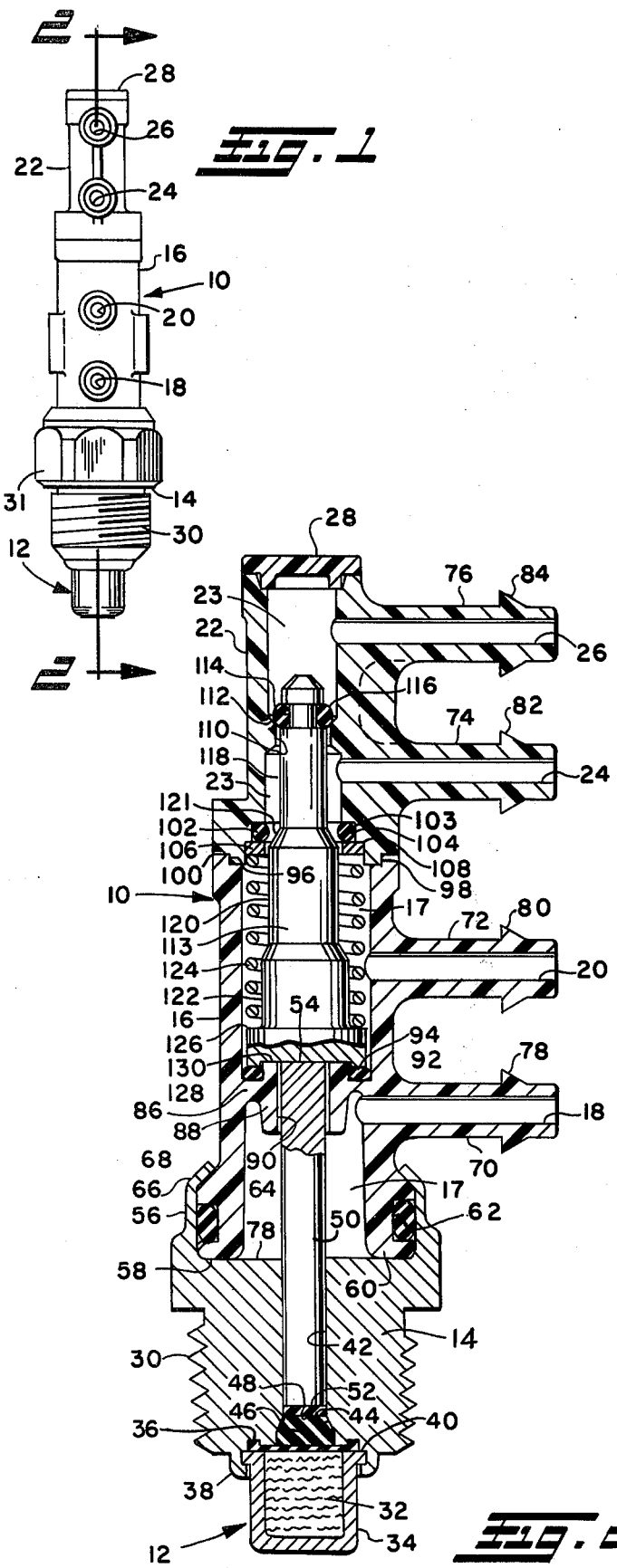
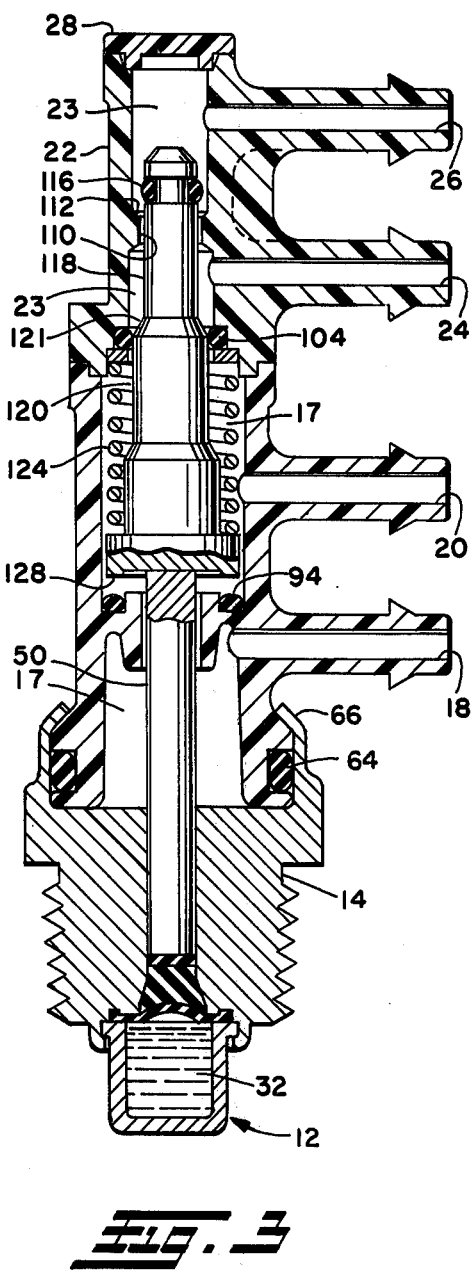

THERMALLY ACTUATED VALVE FOR PLURAL FLUID SOURCES

BACKGROUND OF THE INVENTION

Valves for switching between a plurality of vacuum or pressure lines are finding increasing use in today's automobile and truck engines for operating controls relating to fuel economy and a wide range of accessory equipment, for example, exhaust gas recirculators and spark advance devices. Prior art valves have heretofore utilized separate fluid chambers in cooperation with flexible diaphragms which have proven to be complicated and expensive. Other prior art valves in use have used a single function ball. A major problem encountered in providing such devices has been that of fitting the device into available space around the engine block. This has particularly been a problem with valves which are actuated by a thermal sensor, where it has been necessary to provide a separate threaded access hole in the engine block for connections thereto as, for example, to the engine cooling system. A further disadvantage with prior art devices is that heretofore each valve required its own thermally responsive actuator and thus required a plurality of elements in the valve which has thus inherently increased the manufacturing cost.

SUMMARY OF THE INVENTION

The present invention offers several unique features which overcome the problems encountered with prior art devices by combining several valving functions into one device thereby reducing manufacturing and installation costs. In the present invention, a single internal valve member located in a valve housing fluid passageway is moved between a first and second position by a single thermally responsive actuator for alternately and simultaneously performing valving between four vertically aligned fluid ports. The valve member has three separate sealing means spaced therealong and engage and disengage each of the sealing means with individual valve sealing surfaces in the fluid passageway, the valve member performs three valving functions. One of the valve sealing surfaces is provided by a uniquely arranged, centrally located, seal ring which performs both a valving function and an isolation function by blocking fluid communications between the second and third fluid ports during movement of the valve member from the first to the second position and thereafter maintaining the isolation of the first and fourth fluid ports as the valve member continues movement to the second position.

BRIEF DESCRIPTION OF THE DRAWINGS

FIG. 1 is a plan view of the assembly of the device of the present invention;

FIG. 2 is a cross-sectional view of the embodiment of FIG. 1 taken along section indicating lines 2—2 of FIG. 1 and illustrates the valve in the first position when the thermal element senses temperatures below a predetermined level;

FIG. 3 is a cross-sectional view similar to FIG. 2 illustrating the valve in the second position with the thermal element sensing temperatures at or above a predetermined level.

DETAILED DESCRIPTION

Referring to FIG. 1 and FIG. 2, a thermally responsive vacuum valve indicated generally by numeral 10 is shown having a thermally responsive actuator indicated generally by numeral 12 extending from an adapter 14. A lower housing section 16 defining a fluid chamber portion 17 is provided which includes first and second spaced fluid ports 18 and 20, preferably vertically aligned. An upper housing section 22 defining a fluid chamber portion 23 is provided and has formed therein third and fourth spaced fluid ports 24 and 26 which are also preferably aligned with ports 18 and 20. A separate cover 28 encloses the top end of the upper housing 22. In the presently preferred practice the cover 28, upper housing 22 and lower housing 16 are preferably injection molded from a suitable plastic material, such as a glass filled nylon, and are joined together along a transverse parting line to be hereinafter described, and sealed against fluid leakage by any suitable means as, for example, a sonic welding process. However, other materials and manufacturing techniques may be used to fabricate and seal the housing sections without departing from the present invention. The adapter 14 has a tapered pipe thread 30 at one end and is attached to the bottom end of lower housing 16 and which permits assembly of the valve to the apparatus from which a medium is to be sensed as, for example, on an engine for sensing the temperature of the engine coolant. The housing sections are free to rotate as a unit with respect to the adapter 14 permitting alignment of the fluid ports after installation to any desired position. A relatively thin wall tubular projection 56 is formed in the upper end of the adapter 14 and has located and received therein the lower housing section 16. The lower end 58 of lower housing section 16 has a thickened cylindrical wall portion 60 with an annular groove 62 molded therein in which is received a seal ring 64. Seal ring 64 provides a dynamic seal between the adapter 14 and lower housing section 16. An upper portion 66 of tubular projection 56 has a wall thickness suitable for crimping against a tapered surface 68 of lower housing section 16. Upper portion 66 is crimped over surface 68 with a force sufficient to locate and retain the lower housing in the adapter, but still allow relative rotation therebetween at a breakaway torque from about 10 to 30 inch-pounds, but generally not exceeding 50 inch-pounds in the preferred form. The upper exterior surface of adapter 14 is provided with a hexagonal pattern of wrench flats typically indicated by surface 31 to facilitate installation of the valve.

Referring now particularly to FIG. 2, a volumetrically thermally responsive material 32 is provided which may be of any suitable type well known in the art, for example, a mixture of wax and copper metallic flakes, is disposed within a retaining cup 34 attached to the lower extremity of adapter 14 and formed from mild steel. The mixture is enclosed in the cup by a flexible cover in the form of a resilient, preferably elastomeric diaphragm 36. A mixture of wax and copper metallic flakes 32 which has been found particularly suitable has an abrupt volumetric change across a predetermined narrow temperature band of approximately 7° to 10° F. The volume increase of the mixture while passing through this temperature range is sufficient to result in a movement of the retaining diaphragm 36 of approximately 0.070–0.080 inch. Prior to and after passing through this temperature band, the resultant linear expansion of the mixture is only 0.0003 inch per ° F., an amount insufficient to effect the performance of the valve. The wax and copper flake mixture is preferably formulated to provide a volumetric increase in excess of that initially required to actuate the valve in order to compensate for subsequent deterioration of the wax which leads to reduced volumetric expension over extended periods of time and exposure to high temperatures.

A thin wall annular portion 38 formed on the bottom of adapter 14 is deformed over and around a flange provided on the periphery of the retaining cup 34. The retaining cup 34 is preferably held in place by crimping the thin wall portion 38 around the flanged end of the retaining cup. The retaining diaphragm 36 is sealed against the top surface 40 of the retaining cup and the end of the adapter, thus confining the wax mixture 32 therein. The adapter 14 may be fabricated from steel or other suitable material as, for example, brass and has a centrally located bore 42 located therethrough and a tapered counterbore 44 located at the thermal actuator or lower end of the adapter. A plug 46 which conforms generally to the space defined by the tapered counterbore 44 is received therein. A disc-shaped spacer 48 is slidably received in bore 42 and registers against the upper surface of plug 46. The diaphragm 36, plug 46 and spacer 48 are all formed from a rubber compound which is compatible with the wax-metal flake mixture and suitable for service exposure to the temperatures encountered during operating conditions. A rod 50, preferably fabricated from aluminum, is located within bore 42 with one end thereof 52 in contact with spacer 48 and the other end 54 extending upwardly into lower housing section 16. In operation, the expansion of the mixture 32 is transferred through diaphragm 36, plug 46 and spacer 48 causing upward movement of rod 50. This function will be described subsequently in greater detail.

Fluid ports 18 and 20 are formed in tubular projections 70 and 72 extending from and which are integrally molded with lower housing section 16 and fluidly communicate with fluid chamber portion 17. Similarly, fluid ports 24 and 26 are formed in tubular projections 74 and 76 molded integrally with and extending from upper housing section 22 and fluidly communicate with fluid chamber portion 23. Flared nipples 78, 80, 82 and 84 are provided near the ends of each of the projections for sealing attachment of vacuum or pneumatic hose. As best shown in FIG. 1, all four fluid ports are disposed in common alignment along the upper and lower housing sections.

Located within housing section 16 and intermediate fluid ports 18 and 20 is a transverse wall section 86 having a centrally located tubular portion 88 defining a bore 90 axially therethrough with rod 50 extending therethrough. Clearance is provided between rod 50 and bore 90 sufficient to permit fluid flow freely therethrough.

An annular groove 92 is defined by lower housing section 16, tubular portion 88, and wall section 86 and has received therein a first seal ring 94, also designated as a first valve sealing surface. A registering counterbore 96 provided in the upper end of housing section 16 mates with a registering diameter 98 extending from the bottom end of the upper housing 22 thereby locating housing section 22 with section 16. This junction, forming parting line 100, is later joined by a suitable technique, such as sonic welding. A shoulder 102 is formed in the lower end of upper housing section 22 and a seal ring 104, also designated as a second valve sealing surface is registered thereagainst. The seal ring 104 is received in a counterbore 103 which has an axial depth, less than the cross-sectional width of the seal ring to permit axial compression of the seal ring in the axial direction. A washer 106 having an internal diameter greater than that of seal ring 104 is positioned against a shoulder 108 and also bears against seal ring 104 compressing the counterbore 103.

Located intermediate third fluid port 24 and fourth fluid port 26 and within fluid chamber 23 is an annular shoulder 110 having a chamfered or tapered face 112, also designated as a third valve sealing surface.

As shown in FIG. 2, located within the upper and lower housing sections is a valve member 112 fabricated from a suitable material, preferably aluminum or plastic. An annular groove 114 formed near the upper end of the valve member contains a seal ring 116, also designated as a third seal means. Seal ring 116 is in sealing contact with tapered surface 112 previously designated as a third valve sealing surface. The upper end of the valve member has a diameter 118 sized to clear the internal diameter of shoulder 110 and to permit free fluid flow therethrough. Valve member 112 has an intermediate diameter 120 which is sized to sealingly engage with the inner periphery of seal ring 104. The transition from diameter 118 to larger diameter 120 includes a tapered portion 121 which permits the valve member to engage the internal diameter of seal ring 104 without damage to the seal ring. Received over a diameter 122 of the valve member and guided thereon is a biasing means in the form of a compression spring 124 preferably wound from a chrome-silicon alloy steel. The spring has one end reacting against washer 106 with the other end thereof reacting against a shoulder 126 near the lower end of the valve member for maintaining the valve member in the first position. The spring force on the washer 106 serves to retain the seal ring 104 against shoulder 102. An annular rim portion 128, projecting beyond the bottom end of the valve member 112 and designated as a first valve sealing surface, sealingly engages with seal ring 94 when valve member 112 is in the first position as shown in FIG. 2. The rim portion 128 extends beyond the bottom of the valve member to obtain sufficient compression on seal ring 94.

Seal rings 64, 94, 104 and 116 are preferably formed from an elastomeric material capable of withstanding continuous exposure to temperatures of 400° to 500° F. without degradation.

As shown in FIG. 2, valve member 112 is biased by spring 124 to the first position, at sensed temperatures less than a predetermined minimum. While in the first position, the rim portion 128, designated as a first valve sealing surface, is in sealing contact with seal ring 94, designated as a first seal means, and the seal ring 116, designated as a third seal means, is in sealing contact with tapered surface 112, designated as a third valve sealing surface. The tapered portion 121 is spaced below seal ring 104 by an amount less than the movement of the valve member as produced by the thermal actuator 12. The gap between the taper 121 and the seal ring 104 allows fluid communication between the second and third fluid ports. In this first position the first fluid port is sealed from the second fluid port by seal ring 94, the second and third fluid ports are in fluid communication, and the fourth fluid port is sealed from the third fluid port by seal ring 116.

It will be understood that rod 50 has a length that spans the distance from the top surface 130 of tubular portion 88 to the top surface of spacer 52 without deflecting retaining diaphragm 36 or allowing excessive clearance, thereby preventing expansion of mixture 34 without translation of rod 54. While the device is in the above-described first position, the thermally responsive actuator 12 is inactive since the temperatures sensed are below those necessary to cause an abrupt volumetric increase in the wax and metal flake mixture.

Referring now to FIG. 3, the valve is shown in a second position wherein the thermally responsive actuator 12 is sensing temperatures above the value which has resulted in a corresponding abrupt volumetric increase of the wax and copper flake mixture 34. The expansion of mixture 32 has overcome the biasing force of spring 124 and has moved rod 50 and valve member 112 upward to the second position. The first seal means 128 (annular rim portion on the bottom end of the valve member) is spaced away from the first valve sealing surface 94 (seal ring) in lower housing section 16, thereby permitting fluid communication between first fluid port 18 and second fluid port 20. Second fluid port 20 no longer communicates with third fluid port 24 since the intermediate diameter 120 of the valve member has engaged the second valve sealing surface 104 (seal ring). The third seal means 116 (seal ring) is spaced away from the third valve sealing surface 112 (tapered surface of annular shoulder 110) in upper housing section 22, thereby permitting fluid communication between third fluid port 24 and fourth fluid port 26.

The operation of the valve will now be discussed in a typical application in an engine block with the thermally responsive actuator in contact with the engine coolant medium. During engine start-up, the coolant medium is below the temperature at which the wax and copper flake mixture 32 liquifies and undergoes an abrupt volumetric increase. During this stage of operation, the biasing spring 124 generates a force sufficient to compress seal rings 92 and 116 against corresponding valve sealing surfaces 128 and 112 to maintain sealing and also enough force to prevent the valve member 120 from unseating due to engine vibration or impact loading encountered during vehicle operation. As stated above, in the first position fluid port 20 communicates with fluid port 24 through the upper section of fluid chamber portion 17, and into the lower section of fluid chamber portion 23 by passing between the valve member, seal ring 104 and washer 106. Sufficient clearance is provided between the valve member and seal ring 104 and washer 106 to permit unobstructed fluid flow therebetween. As shown in FIG. 2, fourth fluid port 26 and first fluid port 18 have been effectively isolated from the remainder of the valve. As the temperature of the engine coolant medium rises through a predetermined temperature, the wax copper flake mixture, formulated to melt at this predetermined temperature level, undergoes a volumetric increase resulting in upward movement of the diaphragm 36, plug 46, spacer 48, rod 50 and valve member 120. The initial movement of the valve member results in the disengagement of surface 128 with seal ring 92 and also seal ring 116 with tapered surface 112 during which time all four fluid ports are in fluid communication with each other. If, however, engine control requirements call for a particular valving sequence with respect to the first fluid port 18 and fourth fluid port 26, it can be achieved by varying the amount of compression on seal rings 92 and 116. For example, if it is desired to have the first valve sealing surface 128 unseat from seal ring 92 before seal ring 116 unseats from tapered surface 112, then the compression of seal ring 92 must be less than the compression of seal ring 116. As the wax mixture continues to expand, the valve member moves upward and tapered surface 121 and diameter 120 of the valve member engage with seal ring 104 as the valve member reaches the second position and the valving functions are completed. In the second position fluid port 20 is now isolated from fluid port 24 thereby closing these ports with respect to each other from the normally open position obtained while the valve was in the first position. Three valving functions have thus been achieved with one device, namely, valving fluid port 18 with fluid port 20, valving fluid ports 20 and 24 from a normally open position to a closed position, and valving fluid port 26 with fluid port 24. The valve member will return to its first position under urging of biasing spring 124 as the wax mixture is cooled and contracts.

The present invention thus provides a device capable of receiving vacuum or pressure signals at two spaced ports from various engine sources and substantially simultaneously valving each to another location in response to predetermined engine temperatures by means of a single valve member and a single thermally responsive actuator. The invention provides a unique valving-/isolating seal for valving between the pairs of ports and maintaining the pairs of ports isolated from each other during movement of the valve member thereafter.

Modifications and variations of the preferred forms of the invention will be apparent to those having ordinary skill in the art without departing from the teachings as hereinabove described, and the invention is limited only by the following claims.

What is claimed is:

1. A thermally responsive device for valving a plurality of fluid ports, comprising:
    (a) a housing means defining a fluid chamber, said housing means further defining first, second, third and fourth spaced fluid ports communicating with said fluid chamber;
    (b) valve means disposed within said fluid chamber, said valve means including:
        (i) means defining a first valve sealing surface in said housing means;
        (ii) means defining a second valve sealing surface in said housing means and spaced from said first valve sealing surface, said second valve sealing surface comprising a resilient annular member mounted in said housing means;
        (iii) means defining a third valve sealing surface in said housing means and spaced from said second and first sealing surfaces; and
        (iv) a valve member disposed within said fluid chamber, said valve member being movable between a first and second position and having first, second, and third spaced seal means, thereon, said second seal means on said valve member includes means defining an annular surface for contacting the inner periphery of said second annular member and maintaining said sealing thereagainst during movement of said valve member in said second position, in which first position said first seal means seals against said first valve sealing surface for isolating said first and second fluid ports from each other, said second seal means is spaced from said second valve sealing surface for communicating said second fluid port with said third fluid port, and said third seal means seals against said third valve sealing surface for isolating said fourth fluid port from said third fluid port, and in said second position said first seal means is spaced from said first valve sealing surface for communicating said first fluid port with said second fluid port, said second seal means seals against said second valve seat for isolating said second fluid port from said third fluid port, and said third seal means is spaced from said third valve sealing surface for communicating said third fluid port with said fourth fluid port;

(c) means biasing said valve member to said first position; and (c) thermally responsive means associated with said housing means and including means operative to move said valve member between said first and second positions in response to predetermined temperatures.

2. The device as defined in claim 1, wherein,
(a) said first valve sealing surface is located intermediate said first and second fluid ports;
(b) said second valve sealing surface is located intermediate said second and third fluid ports; and
(c) said third valve sealing surface is located intermediate said third and fourth fluid ports.

3. The device as defined in claim 1, wherein said first valve sealing surface, said second valve sealing surface, and said third seal means are formed from an elastomeric material.

4. The device as defined in claim 1, wherein said housing means includes a lower housing member having said first and second fluid ports spaced thereon and an upper housing member having said third and fourth fluid ports spaced thereon, said upper and lower housing members being joined in a fluid sealing arrangement along a parting line.

5. The device as defined in claim 4, wherein said upper and lower housing members are formed from a plastic material.

6. The device as defined in claim 5, wherein said upper and lower housing members are sonically welded together at said parting line.

7. The device described in claim 6, wherein said first, second, third and fourth fluid ports are disposed in a common alignment.

8. A thermally responsive device for valving a plurality of fluid ports, comprising:
(a) a housing means defining a fluid chamber, said housing means further defining first, second, third and fourth spaced fluid ports communicating with said fluid chamber;
(b) valve means disposed within said fluid chamber, said valve means including:
(i) means defining a first valve sealing surface in said housing means;
(ii) means defining a second valve sealing surface in said housing means and spaced from said first valve sealing surface, said second valve sealing surface comprising a resilient annular member mounted in said housing means;
(iii) means defining a third valve sealing surface in said housing means and spaced from said first and second valve sealing surfaces; and
(iv) a valve member disposed within said fluid chamber, said valve member being movable between a first and second position and having first, second and third spaced seal means thereon, said second seal means on said valve member includes means defining an annular surface for contacting the inner periphery of said second annular member and maintaining said sealing thereagainst during movement of said valve member in said second position, in which first position said first seal means seals against said first valve sealing surface for isolating said position, said second seal means is spaced from said second valve sealing surface communicating said second fluid port with said third fluid port, and in which first position said third seal means seals against said third valve sealing surface for isolating said fourth fluid port from said third fluid port, in which second position said first seal means is spaced from said first valve sealing surface for communicating said first fluid port with said second fluid port, in which second position said second seal means seals against said second valve sealing surface for isolating said second fluid port from said third fluid port, and in which second position said third seal means is spaced from said third valve sealing surface for communicating said third fluid port with said fourth fluid port;

(c) means biasing said valve member to said first position, said biasing means being effective for retaining said means defining said second valve sealing surface within said fluid chamber; and (d) thermally responsive means associated with said housing means and including means operative to move said valve member between said first and said second positions in response to predetermined temperatures.

9. The device as defined in claim 8, wherein,
(a) said first valve sealing surface is located intermediate said first and second fluid ports;
(b) said second valve sealing surface is located intermediate said second and third fluid ports; and
(c) said third valve sealing surface is located intermediate said third and fourth fluid ports.

10. The device as defined in claim 8, wherein said biasing means includes a spring.

11. The device as defined in claim 8, wherein,
(a) said housing means includes an annular shoulder formed in the inner periphery of said fluid chamber intermediate said second and third fluid ports;
(b) said annular member sealingly contacting the internal surface of said fluid chamber and the outer periphery of said valve member, said annular member being registered against said shoulder; and
(c) washer means having said valve member received therethough and contacting said seal ring with said biasing means reacting thereagainst for retaining said seal ring against said shoulder.

12. A thermally responsive device for valving a plurality of fluid ports, comprising:
(a) a housing means defining a fluid chamber, said housing means further defining first, second, third and fourth spaced fluid ports communicating with said fluid chamber;
(b) valve means disposed within said fluid chamber, said valve means including:
(i) means defining a first valve sealing surface in said housing means, said first valve surface comprising a resilient annular member mounted in said housing means;

(ii) means defining a second valve sealing surface in said housing means and spaced from said first valve sealing surface;

(iii) means defining a third valve sealing surface in said housing means and spaced from said second and first sealing surfaces; and (iv) a valve member disposed within said fluid chamber, said valve member being movable between a first and second position and having first, second, and third spaced seal means, thereon, said first seal means spaced proximate the end region of said valve member, in which first position said first seal means seals against said first valve sealing surface for isolating said first and second fluid ports from each other, said second seal means is spaced from said second valve sealing surface for communicating said second fluid port with said third fluid port, and said third seal means seals against said third valve sealing surface for isolating said fourth fluid port from said third fluid port, and in said second position said first seal means is spaced from said first valve sealing surface for communicating said first fluid port with said second fluid port, said second seal means seals against said second valve seat for isolating said second fluid port from said third fluid port, and said third seal means is spaced from said third valve sealing surface for communicating said third fluid port with said fourth fluid port;

(c) means biasing said valve member to said first position; and (d) thermally responsive means associated with said housing means and including means operative to move said valve member between said first and second positions in response to predetermined temperatures.

13. The device as defined in claim 12, wherein, said housing means defines an annular groove opening axially relative to said valve member, said resilient annular member being received in said groove.

* * * * *